Oct. 22, 1946.   H. F. BENNETT   2,409,971
CATADIOPTRIC TELEVISION PROJECTOR
Filed June 19, 1945

HAROLD F. BENNETT
INVENTOR
BY
ATTY & AG'T

UNITED STATES PATENT OFFICE 2,409,971

CATADIOPTRIC TELEVISION PROJECTOR

Harold F. Bennett, Rochester, N. Y., assignor to Eastman Kodak Company, Rochester, N. Y., a corporation of New Jersey Application June 19, 1945, Serial No. 600,364

8 Claims. (Cl. 88—57)

This invention relates to catadioptric systems corrected for use at finite conjugates.

An object of the invention is to provide a highly corrected and extremely large aperture optical system for projecting an image of the fluorescent screen of a cathode ray tube upon a substantially flat projection screen and for other similar purposes.

Various kinds of optical systems have been proposed for use in television receivers for projecting the fluorescent screen. One such system is the reflecting system of the Schmidt type and modifications thereof. It is usual to shape the end of the cathode ray tube to fit the most convenient curvature of field of the optical system. This has usually proven easier and more satisfactory than correcting the optical system per se to obtain a flat field.

For simplicity and to avoid ambiguity in the following description of the invention, the short conjugate will be referred to as the object and the long conjugate as the image in accordance with the conditions of use as a projection system. It will be readily understood, of course, that any system can be used equally as well with the light traveling in the opposite direction.

A variation of the Schmidt system which is particularly well suited for use as a television projector is disclosed and described in my copending application Serial No. 590,598 filed April 27, 1945. The optical system described therein consists of a concave spherical reflecting surface and at least one meniscus correcting component whose front and back surfaces are approximately concentric therewith and also with the diaphragm.

The examples shown in my copending application are all corrected for a very distant image. It was found by computations that if one of these systems is used unchanged at finite conjugates the spherical aberration is undercorrected. This is an elementary matter, however, as it is easy to change the aberration in the direction of greater overcorrection by increasing the thickness of the meniscus component. More important is the fact that the object surface is more strongly curved at finite conjugates, (assuming the image to be on a concentric sphere) and hence would not fit onto the same supporting surface. It is easy, however, to adapt for this condition also. To do so it is only necessary to redesign the appropriate lens surface to coincide with the curved object surface both in position and in curvature and then to vary the refractive index or the thickness of the correcting element or elements until the aberration is corrected. If the system is maintained fully concentric (which is usually the easiest method of design even if it is not to be fully concentric in its final form) the coma, astigmatism, lateral color, and angular distortion are all automatically corrected.

Ordinarily, however, a curved projection screen is not satisfactory. Usually the image is to be made flat, and then real troubles begin. The system departs from complete concentricity, thereby losing the advantages arising from the complete automatic correction of lateral aberrations and of the variation of spherical aberration with obliquity as explained in the copending application already mentioned.

On the other hand, changing from a curved to a flat image surface gives the advantage of a less strongly curved object surface. The reason for this is easily seen. The oblique distance to the projection screen is greater than the axial distance, and accordingly, by elementary optics, the corresponding point in the object surface must be farther from the common center of curvature, hence it lies on a weaker curve.

I have discovered that in any theoretical system which is completely concentric except for the object surface and plane image surface at real finite conjugates, and in which the object and image are in air the object surface must have a radius of curvature at the vertex equal to F.

I have discovered further that the object should have the form of an ellipsoid of revolution, the major axis of which coincides with the axis of the system, if the image is to be exactly a plane. The eccentricity of this ellipsoid, however, does not differ greatly from that of an approximating sphere unless the magnification is about 3 or smaller, and so a spherical surface can usually be used in the neighborhood of the axis and up to about ±20 or 30°. The position of this object surface is of course between the principal focal surface and its center of curvature, according to elementary optics.

According to the present invention, a catadioptric objective suitable for use as a television projector comprises a concave spherical reflecting surface whose radius of curvature is between 2F and 3.5F where F is the focal length of the objective, a positive meniscus lens element concave in the same direction as the reflecting surface, and whose concave surface substantially coincides with the object to be projected, and at least one meniscus correcting component whose front and back surfaces are approximately concentric with the spherical reflecting surface. The correcting element or elements may be concave or convex toward the spherical reflecting surface, or, in fact, the reflecting surface may be formed by silvering a convex surface thereof.

The heart of the present invention lies in the positive meniscus element. This lens is axially spaced from the center of curvature of the reflecting surface by a distance E which is less than F. The radius of curvature at the vertex of its concave surface is between F and 5F, and that of its convex surface is between 0.4E and 1.1E. It is preferred that this element be as thin as convenient; its edge thickness should be less than 0.08F.

The arrangement whereby the object lies substantially on the concave surface of the positive meniscus element is very convenient, especially in television, particularly since this lens may form the end of the cathode ray tube itself.

I have discovered that when this concave lens surface is made weaker than concentric in order to match the object curvature 1/F of an otherwise concentric system with plane finite image that it then constitutes a further departure from concentricity, that it decreases the Petzval sum (in absolute value), and that it thus further decreases the curvature of the object surface, and must itself be further weakened. This is a converging series of changes, however, and finally an object surface and a lens surface are found which substantially coincide and which have a radius of curvature greater than F.

I have discovered further that if all the other surfaces of the system are concentric with the diaphragm aperture, then the spherical aberration varies with the obliquity in the direction of greater overcorrection at the margin of the field. The obvious arrangement to compensate for this is to undercorrect at the axis and to overcorrect at the margin, thus achieving an advantageous balance. I was not satisfied with the results indicated by computations of such a system however and was wondering whether it would be possible to improve this situation when it occurred to me that the thin meniscus lens which was to form the end of the cathode ray tube had a small correcting effect upon the spherical aberration, and that since this element is so close to the focal surface its effect is somewhat analogous to that of a plane-parallel plate. In other words, the thickness is the controlling factor, so that if this lens were made thinner at the edge than at the center, its correcting effect at the edge of the field might be less than the corresponding effect at the center. I immediately tried experimental computations with the convex surface of the meniscus lens stronger than concentric. It was a little annoying to find that the object curvature again becomes less on account of the further decrease in the negative Petzval sum, and I feared that this further departure from concentricity might increase the variation of spherical aberration with obliquity and counteract the correcting effect of the thinner edge of the lens. When the computations were completed, however, these fears were seen to be groundless, and a form was found in which the spherical aberration is substantially corrected both at the center and at the edge.

A slight drawback of this experimental form was a small degree of coma caused by the oblique traversal of the non-concentric lens by the cones of light radiating from the object surface toward the concave mirror. I found that this coma, particularly the portion of it which is of higher order than the Seidel aberration, becomes worse if the general thickness of this lens is increased. Hence it is advantageous to make this lens as thin as is practicable, and in any case the edge thickness measured approximately radially should be less than 0.08F. If this limitation is observed it is fairly easy to substantially eliminate coma by small deviations from concentricity in the rest of the system.

The astigmatism is infinitesimal in systems according to the invention, and an extremely sharp image can be obtained even out to the edges of an angular field of $\pm 30°$ if desired. The angle spoken of here is that subtended at the center of curvature of the reflecting surface.

Several different forms of catadioptric systems are described in my copending application already mentioned. In addition there are forms intermediate between those shown and forms combining different features of the various forms shown. Some of the variations shown or suggested are comparatively less expensive, others have extremely good correction of zonal spherical aberration at extremely high aperture, while others have both axial and lateral color correction. It will be apparent to all skilled in lens optics that the present invention can be applied to nearly any of these systems, the only limitation being the actual mechanical interference of the meniscus correcting components with the positive meniscus lens next to the object surface.

Further details of the invention will be explained in connection with the accompanying drawing, in which.

Figure 1:
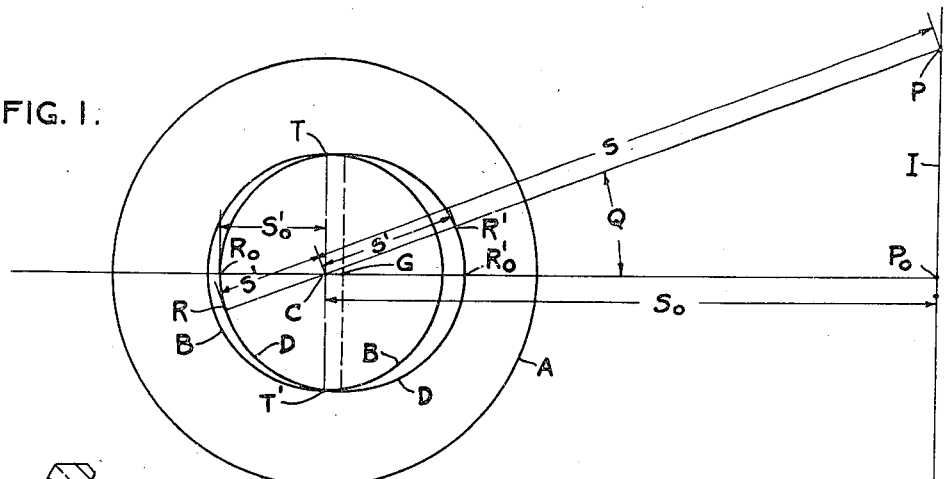
Fig. 1 is a diagram to explain certain theoretical aspects of concentric systems.

Fig. 1 represents in axial section a transparent thin spherical shell A such as a soap bubble and its principal focal surface B for singly reflected rays. Assuming a small bundle of rays directed toward the center C, any infinitely remote object point (not shown) will be imaged in two points, a virtual image point on the near side of the focal sphere B due to reflection at the convex nearer surface of the sphere A, and a real image diametrically opposite on the focal sphere B due to reflection at the concave farther side of the sphere A. The focal sphere B has a diameter equal to 2F where F is the focal length. This much is elementary.

This simple system is illustrative of all strictly concentric catadioptric systems, although of course in practical systems such as those shown in my copending application already mentioned, the angular field is limited to less than 180° Also allowance must be made in known manner if the refractive index in the image space differs from that in the object space as it does in immersion systems.

To show the effect of finite conjugate distances, an image plane I is shown perpendicular to the axis $CP_0$ through the center C of the sphere and the pole $P_0$ of the image plane.

I have discovered that, in order to produce an exactly plane image, the object must be on an elliptical curve D. Either it is a real object on the minor arc $TR_0T'$ if a concave reflecting surface is used, or a virtual object on the major arc $TR_0'T'$ if a convex reflecting surface is used. The proof of this fact is briefly outlined in the following paragraphs.

The distance $CP_0$ of the axial point $P_0$ of the plane from the center C of the sphere is designated as $S_0$. The distance CP of any point on the image plane I is designated as S. The angle $PCP_0$ between the principal axis $CP_0$ and an auxiliary axis CP drawn through the point P is designated as Q.

The axial point $P_0$ of the image is conjugate to either of the poles $R_0$, $R'_0$ of the short conjugate surface, depending upon whether the reflection takes place at the concave or convex surface. These alternatives are expressed by the $\pm$ sign in the well known equation $$\frac{1}{s'} = -\frac{1}{s} \pm \frac{1}{f} \qquad \text{(Equation 1)}$$

where $s'$ designates the distance from the center C of the sphere to a conjugate point R or R'.

The usual sign convention is followed here, namely a distance to the right of the center C is designated as positive, and a distance to the left as negative, but $f$ is always positive.

Specifically for the axial point $P_0$, Equation 1 becomes $$\frac{1}{s'_0} = -\frac{1}{s_0} \pm \frac{1}{f}$$

or $$s'_0 = -\frac{s_0 f}{s_0 + f} \text{ or } +\frac{s_0 f}{s_0 - f}$$

giving the position of the points $R_0$ and $R_0'$ conjugate to $P_0$. Then, if the short conjugate (object) surface is an ellipsoid of revolution, its center G must be midway between the vertices $R_0$ and $R_0'$, that is at a distance $$+\frac{s_0 f^2}{s_0^2 - f^2}$$

toward the image I from the center C of the system, and its semiaxis $a$ in this direction must be half the distance between these vertices, or $$a = \frac{s_0^2 f}{s_0^2 - f^2}$$

where $a$ is merely the conventional designation for the semi-axis of an ellipse.

Correspondingly, the distance $s$ of the point P measured from the center C of the system is expressed by $$s = \frac{s_0}{\cos Q}$$

and the points R and R' conjugate to P lie on the auxiliary axis CP at distances $s'$ from the center C which are found by substituting this value of $s$ into Equation 1, above. Thus $$\frac{1}{s'} = -\frac{\cos Q}{s_0} \pm \frac{1}{f} \text{ or } s' = \frac{-s_0 f}{f \cos Q \pm s_0}$$

an equation which defines the object surface conjugate to the plane image surface.

This equation will now be analyzed to determine the shape of the object surface. The analysis could be done either in polar coordinates or in rectangular coordinates. The former is slightly shorter, but the latter will be used here because it will be more readily understandable by the majority of optical engineers.

Taking as an origin of rectangular coordinates the point G (already defined) which must be the center of the ellipse, if it is an ellipse, then the coordinates $x$, $y$, of the short conjugate points R, R' are given by $$x = s' \cos Q - \frac{s_0 f^2}{s_0^2 - f^2}$$

$$= s_0 f \left[ \frac{-\cos Q}{f \cos Q \pm s_0} - \frac{f}{s_0^2 - f^2} \right]$$

and $$y = s' \sin Q = \frac{-s_0 f \sin Q}{f \cos Q \pm s_0}$$

The semi-axis in the $y$ direction is found by setting $x$ equal to zero, leading to the following equation for cos Q:

$$\frac{-\cos Q}{f \cos Q \pm s_0} = \frac{f}{s_0^2 - f^2}$$

or $$\cos Q = \pm \frac{f}{s_0}$$

so that the value of $y$ at this point is $$\frac{-s_0 f \sqrt{1 - \frac{f^2}{s_0^2}}}{\mp \frac{f^2}{s_0} \pm s_0} = \pm \frac{s_0 f}{\sqrt{s_0^2 - f^2}}$$

which value is the semi-axis $b$.

This gives values of $x$, $y$, $a$, and $b$ to try out in the standard equation of the ellipse $$\frac{x^2}{a^2} + \frac{y^2}{b^2} = 1$$

as follows $$\frac{x^2}{a^2} = \frac{(s_0^2 - f_0^2) \cos^2 Q}{s_0^2 (f \cos Q \pm s_0)^2} + \frac{2f(s_0^2 - f^2) \cos Q}{s_0^2 (f \cos Q \pm s_0)} + \frac{f^2}{s_0^2}$$

$$\frac{y^2}{b^2} = \frac{(s_0^2 - f^2) \sin^2 Q}{(f \cos Q \pm s_0)^2}$$

If the right hand sides of these equations are reduced to the common denominator $s_0^2 (f \cos Q \pm s_0)^2$, and added, the numerator may be written $(s_0^2 - f^2)[s_0^2 \cos^2 Q - f^2 \cos^2 Q +$
$\qquad s_0^2 \sin^2 Q + 2f^2 \cos^2 Q \pm 2fs_0 \cos Q]$
$+ f^2 [f^2 \cos^2 Q \pm 2fs_0 \cos Q + s_0^2]$ Remembering that $(\cos^2 Q + \sin^2 Q) = 1$, it is easy to reduce this numerator to the form $$s_0^2 [f^2 \cos^2 Q \pm 2fs_0 \cos Q + s_0^2] + f^2 [0]$$

Then, since this numerator is equal to the denominator, the whole sum is equal to unity, thus proving the curve D to be an ellipse.

At the axial vertex the radius of curvature according to the textbook formula is $$\pm \frac{b^2}{a}$$

and this is easily seen to be equal to $\pm f$, as already stated.

In actual systems according to the invention, the optical surfaces are not strictly concentric, so that the object which is conjugate to a plane image may not lie exactly on an elliptical surface as indicated by the above theory. However, it follows an ellipse very closely, and in any case, for extremely sharp focussing, this surface should be less strongly curved near the edge than at the axis.

Figure 2:
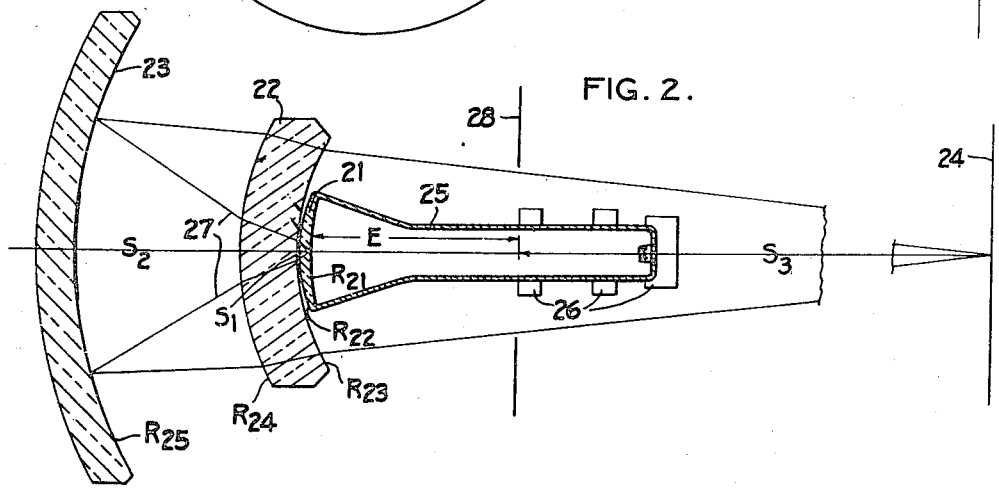
Figs. 2 and 3 show two embodiments of the invention.

In Fig. 2, the positive meniscus lens 21 forms the end of the cathode ray tube 25 and has fluorescent material deposited on its inner face $R_{21}$. The electrical or magnetic controls 26 for the electron beam are shown schematically. Light is emitted by the fluorescent screen when bombarded by electrons. Two rays of light 27 are shown passing to the left through the positive meniscus lens 21 and the nearly concentric meniscus correcting lens 22 to the reflector 23. The rays are here reflected and pass through the peripheral portion of the correcting lens 22 and are projected to a focus on the screen 24 at the right.

Suitable specifications for a system of this type are given for an equivalent focal length of 100 mm. in Table 1.

Equivalent useful cone=f/0.8 at short conjugate.
Field subtended at diaphragm=±18°.
Effective magnification (chord) at edge of field=6.7.

| Lens | N | V | Radii | Thicknesses |
|---|---|---|---|---|
| 21 | 1.52 | 58.0 | $R_{21}=+110.3$ mm. $R_{22}=+82.1$ | $t_1=4.5$ mm. $s_1=1.3$. |
| 22 | 1.5725 | 57.4 | $R_{23}=+91.7$ $R_{24}=+130.1$ | $t_2=35.2$. $s_2=135.21$. |
| 23 | −1 | | $R_{25}=+256.7$ | $E=88.1$. $s_3=528.3$. |

In this table N designates the refractive index for the D line of the spectrum and V the dispersive index. The radii $R_{21}$ to $R_{25}$ are all concave toward the long conjugate and are numbered in the order in which they are first encountered by the light. A reflection is indicated by a negative refractive index N.

It will be seen that this system resembles that of Fig. 5, Example 3 of my copending application, with the positive meniscus lens added.

Figure 3:
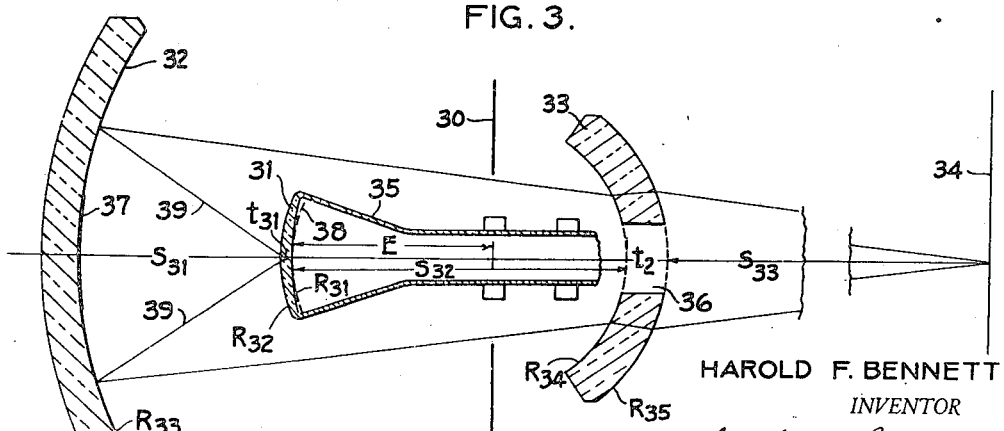

In Fig. 3 the positive meniscus lens 31 likewise forms the end of the cathode ray tube 35. The light rays 39 emitted from the fluorescent material deposited on the concave surface $R_{31}$ pass to the left through this lens to the front silvered mirror 32 where they are reflected through the meniscus correcting lens 33 and projected to a sharp focus on the screen 34. In some cases the tube used is too long to fit into the space between the mirror and the correcting lens with its fluorescent screen in proper focus. The lens 33 is then provided with a hole 36 as shown through the center to provide room for the end of the tube. The mirror may be silvered on an annular zone with a dark spot 37 at the center to reduce in known manner the deleterious reflection of light back onto the fluorescent screen. Table 2 gives suitable data for a system of this type with an equivalent focal length of 100 mm.:

Table 2, Fig. 3

Equivalent useful cone f/0.9 at short conjugate.
Field=±22° subtended at diaphragm.
Paraxial magnification 4.8.

| Lens | N | V | Radii | Thicknesses |
|---|---|---|---|---|
| 31 | 1.517 | 64.5 | $R_{31}=+111.0$ mm. $R_{32}=+75.7$ | $t_{31}=5.05$ mm. $s_{31}=142.3$. |
| 32 | −1 | | $R_{33}=+223.4$ | $s_{32}=146.2$. |
| 33 | 1.517 | 64.5 | $R_{34}=-70.2$ $R_{35}=-96.8$ | $t_{33}=27.2$. $s_{33}=272.2$. |

Here again N designates the refractive index for the D line and V the dispersive index; the radii of curvature at the vertex are given as $R_{31}$, $R_{32}$, etc., and are designated as concave or convex toward the projection screens by the + and the − signs respectively. A reflection is denoted by the index N being given as negative.

In Fig. 3 the negative correcting lens is thinner and more strongly curved than that of Fig. 2, and as explained in my copending application it has slightly more zonal spherical aberration. I have reduced the effect of the zonal spherical aberration by making the system of shorter focal length for a given size of fluorescent screen and with a correspondingly wider angular field. The effect of axial chromatic aberration is also reduced by the reduction in focal length. Similarly there is a reduction in the diameter of the mirrors and the overall length of the system. These are some of the important differences between Figs. 3 and 2.

The surface $R_{31}$ upon which the fluorescent material is deposited is made slightly aspherical being less strongly curved near the edge than at the center. In Fig. 3 this is shown in an exaggerated manner by the deviation from the osculating sphere 38 tangent to the surface at the vertex.

As is well known in the art, a positive field lens may be used at the long conjugate screen. This screen is usually of the translucent type used for rear projection. This field lens would further flatten the curved object surface and would have the additional beneficial effect of concentrating the transmitted rays in a more useful direction. It would be impractical to make this lens strong enough to completely flatten the field because of its great thickness, bulk, and weight.

It may also be pointed out that a slightly aspherical zonal correcting plate may be combined with either system, in the manner shown in Fig. 8 of my copending application, the center being pierced to allow space for the cathode ray tube. This would be positioned at or near the plane of the diaphragm 28 or 30.

I claim:

1. A catadioptric objective for use at finite conjugates comprising in optical alignment a concave spherical reflecting surface whose radius of curvature is between 2F and 3.5F where F is the focal length of the objective, a positive meniscus lens element concave in the same direction as the reflecting surface and whose concave surface substantially coincides with the short conjugate surface whereby the long conjugate surface is a plane, and at least one meniscus correcting component whose front and back surfaces are approximately concentric with the spherical reflecting surface whereby the spherical aberration is considerably less than that of an uncorrected spherical mirror of like focal length.

2. An objective according to claim 1 in which the positive meniscus element is axially spaced from the center of curvature of the reflecting surface by a distance E which is less than the focal length F of the objective, the radius of curvature at the vertex of its concave surface being between F and 5F, and that of its convex surface being between 0.4F and 1.1E.

3. An objective according to claim 1 in which the positive meniscus element is axially spaced from the center of curvature of the reflecting surface by a distance E which is less than the focal length F of the objective, the radius of curvature at the vertex of its concave surface is between F and 5F, that of its convex surface is between 0.4E and E, and its edge thickness is less than 0.08F.

4. An objective according to claim 1 in which the positive meniscus lens element is the end of a cathode ray tube and has fluorescent material deposited upon its concave surface.

5. A catadioptric objective for use at finite conjugates comprising a concave spherical reflecting surface whose radius of curvature is between 2F and 3.5F where F is the focal length of the objective, at least one meniscus correcting component whose front and back surfaces are approximately concentric with the spherical reflecting surface, and a positive field lens close to one of the conjugate surfaces whereby the long conjugate surface is substantially plane and the short conjugate surface has a radius of curvature between F and 5F and is convex in the direction that light leaves it to pass through the objective.

6. An objective according to claim 5 in which the edge thickness of the field lens is less than 0.08F.

7. An objective according to claim 5 in which the short conjugate surface is less strongly curved near the edge than near the center.

8. A catadioptric objective for use at finite conjugates consisting of a concave spherical mirror with a radius of curvature between 2.1F and 2.6F, where F is the focal length of the objective, a positive meniscus lens element concave in the same direction as the mirror and located between said mirror and its center of curvature, and a meniscus correcting element whose two surfaces are approximately concentric with said mirror, in which the surfaces of the two lens elements have radii of curvature between the limits listed as follows:

| Lens and surface | Limits |
| --- | --- |
| Positive meniscus element: | |
| Concave surface | F and 1.2F. |
| Convex surface | 0.8E and 1.1E. |
| Meniscus correcting element: | |
| Concave surface R | 0.6F and F. |
| Convex surface | 1.2R and 1.5R. | where R is the radius of curvature of the concave surface of the meniscus correcting element, where the concave surface of the positive meniscus element is at a distance E from the center of curvature of the reflecting surface and substantially coincides with the short conjugate focal surface of the objective, and where the long conjugate focal surface is substantially flat.

HAROLD F. BENNETT.